United States Patent
Long, Jr.

(10) Patent No.: US 6,347,445 B2
(45) Date of Patent: *Feb. 19, 2002

(54) METHOD AND APPARATUS FOR REMOVING AND INSTALLING SPINDLE AND CUTTING BLADES

(76) Inventor: David P. Long, Jr., 1111 30$^{th}$ Ave. North, St. Petersburg, FL (US) 33704

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/498,974

(22) Filed: Feb. 7, 2000

(51) Int. Cl.$^7$ ................................................ B23P 6/00
(52) U.S. Cl. ........................ 29/402.08; 29/402.03; 29/426.1; 29/281.5; 269/319

(58) Field of Search ..................... 29/426.1, 402.08, 29/240, 283, 281.1, 281.4, 281.6, 267, 402.03, 402.15, 281.5; 76/85; 269/319, 43, 37; 81/488, 125.1, 13

(56) References Cited

U.S. PATENT DOCUMENTS

| | | | |
|---|---|---|---|
| 847,768 A | * 5/1907 | Hartman | |
| 1,076,919 A | * 10/1913 | Speck | |
| 2,502,587 A | * 4/1950 | Phipps | |
| 4,882,960 A | * 11/1989 | Kugler | 81/488 |

* cited by examiner

Primary Examiner—S. Thomas Hughes
Assistant Examiner—John C. Hong

(57) ABSTRACT

A method of removing and installing two blades and their mounting spindles from the deck of a lawn mower including holding the spindle heads simultaneously against rotation with a wrench have two operative ends and an adjustable connection connecting the operative ends.

4 Claims, 3 Drawing Sheets

METHOD AND APPARATUS FOR REMOVING AND INSTALLING SPINDLE AND CUTTING BLADES

BACKGROUND OF THE INVENTION

1. Field of the Invention

The present invention relates generally to a method and the apparatus for removing and installing spindles and cutting blades and more particularly, with respect to a lawn mower having two or more cutting blades mounted on separate spindles, a method and apparatus for removing and installing such blades and spindles.

2. Description of Prior Art

In commercial lawn mowers having two or more spindle mounted cutting blades, the prior art method of removing the nut from the top of the spindle so that the spindle could be withdrawn downwardly from the pulley mounted thereon and from the mower deck and then from the mower blade itself, so that the blade could be removed and sharpened or replaced, was to reach under the mower with a wrench and grasp the head of one of the spindles with the wrench. The usual nut at the top of the spindle was then removed by using a second wrench thereon. The wrench on the head of the spindle had to be held in order to keep the wrench from moving and spindle from rotating and, since the blades are still sharp when being removed and are extremely sharp when being installed, the hand holding the wrench on the spindle head was subject to being injured.

SUMMARY OF THE INVENTION

The present invention utilizes a wrench having at least two pair of spaced operative interconnected ends; with each end being operative to secure the head of one of said spindles and with the interconnecting member being space adjustable so that the space between the operative ends can be adjusted whereby both ends can simultaneously be connected to the spindles to the prevent the rotation of the spindles and movement of the wrench so that the nut on the spindle top can be removed. To reinstall, the spindles are then re-inserted through the blades, the deck and the pulley, the heads of the spindles are held by the double ended wrench, there is no need to any longer manually hold the head wrench and the nut on the top of the spindle can be securely threaded on the top of the spindle and thereby mount the blades on the mower and remove the double ended wrench from the spindle heads.

DETAILED DESCRIPTION OF THE PREFERRED EMBODIMENT

The present invention concerns a method for installing and/or removing blade spindles from a multiple spindle commercial lawn mower having two or more blade spindles.

Figure 1:
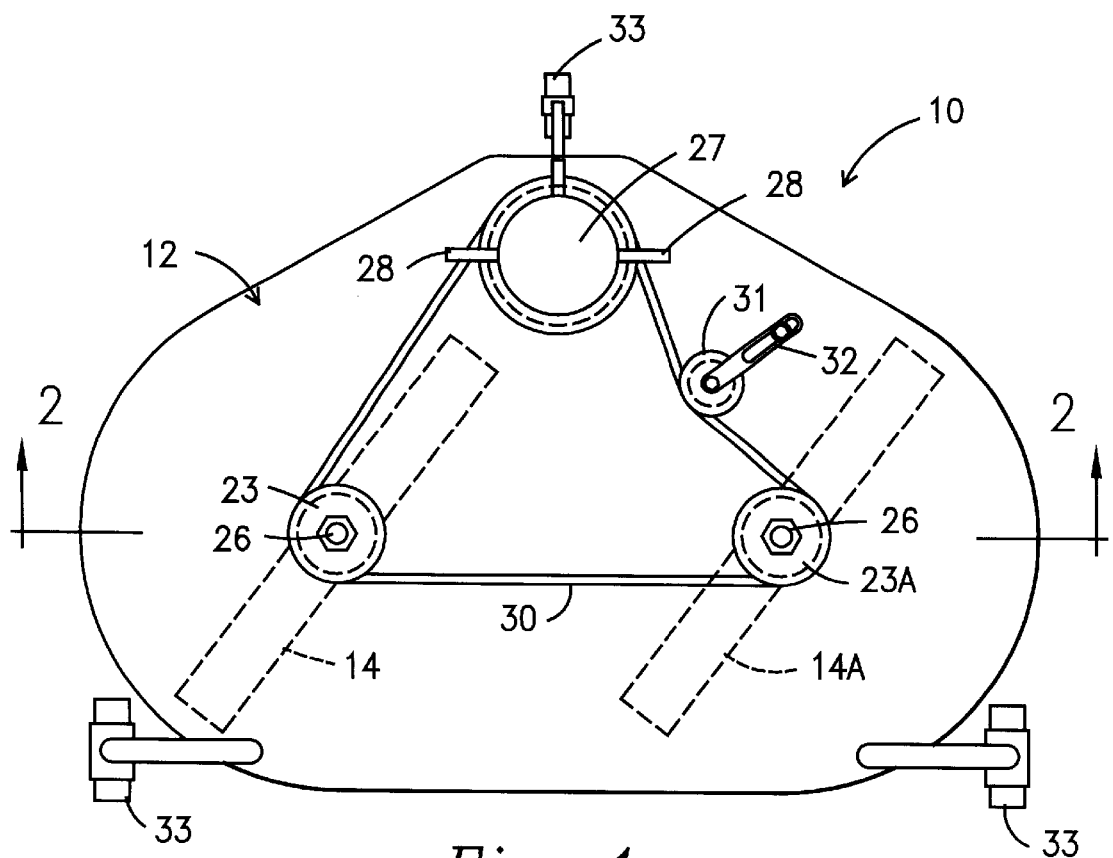
FIG. 1 is a plan view of a lawn mower suitable for use in the invention.
Figure 2:
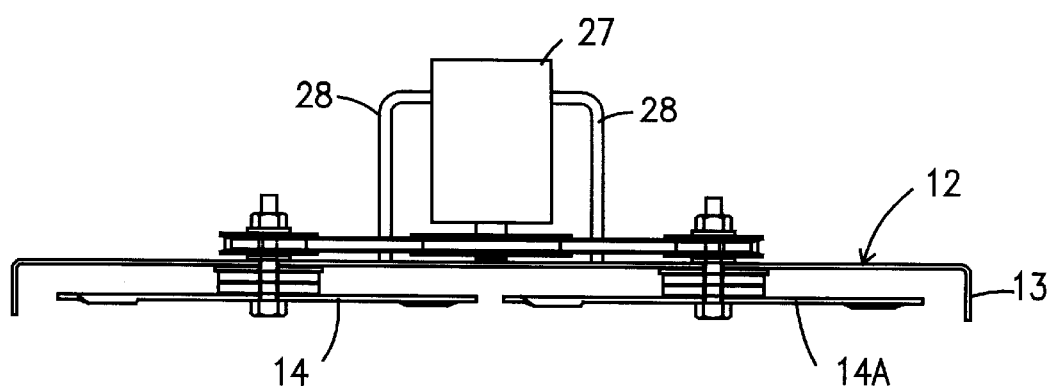
FIG. 2 is a cross sectional view taken along the line 2—2 in FIG. 1.
Figure 3:
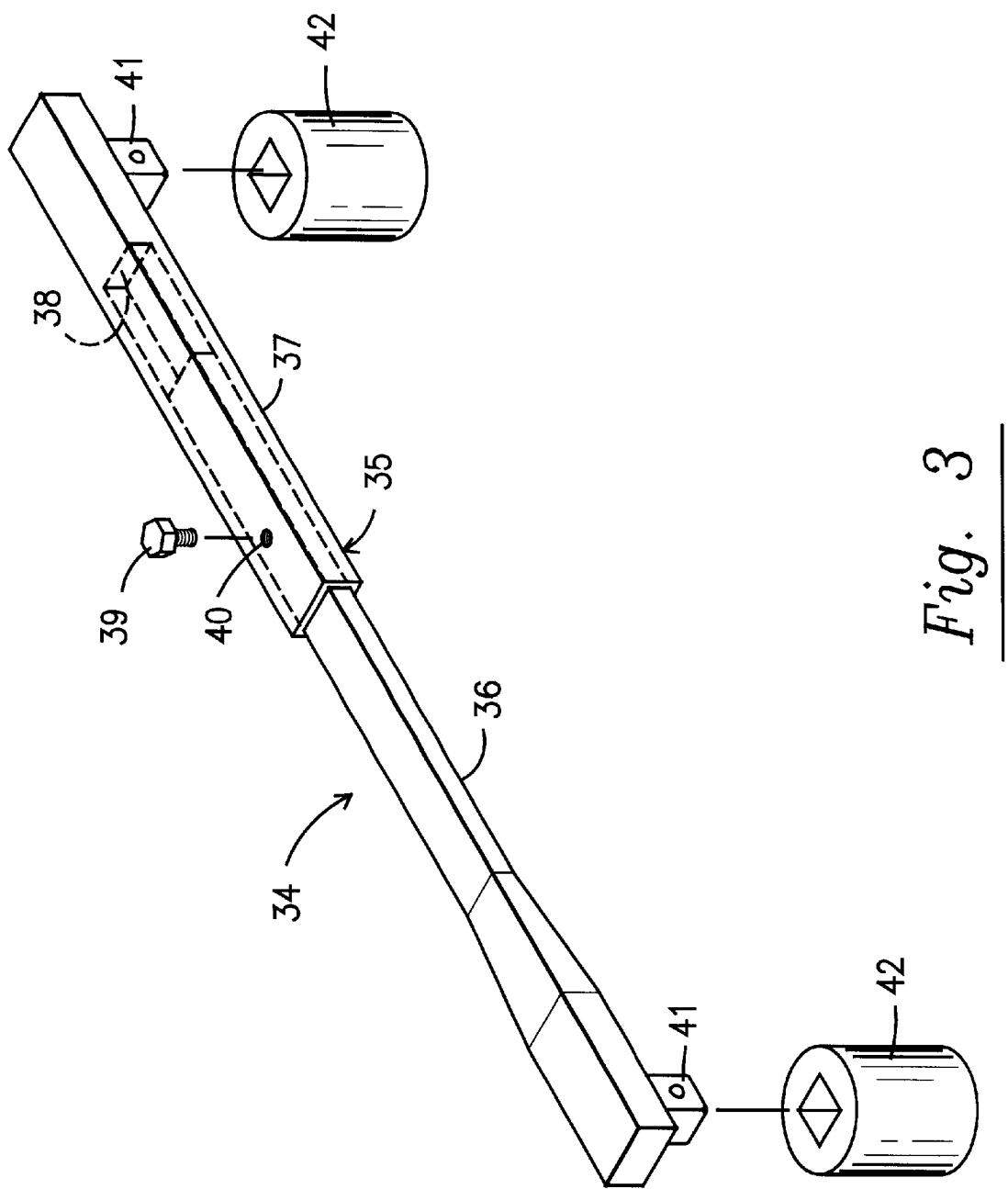
FIG. 3 shows a double ended wrench suitable for use in this invention.
Figure 4:
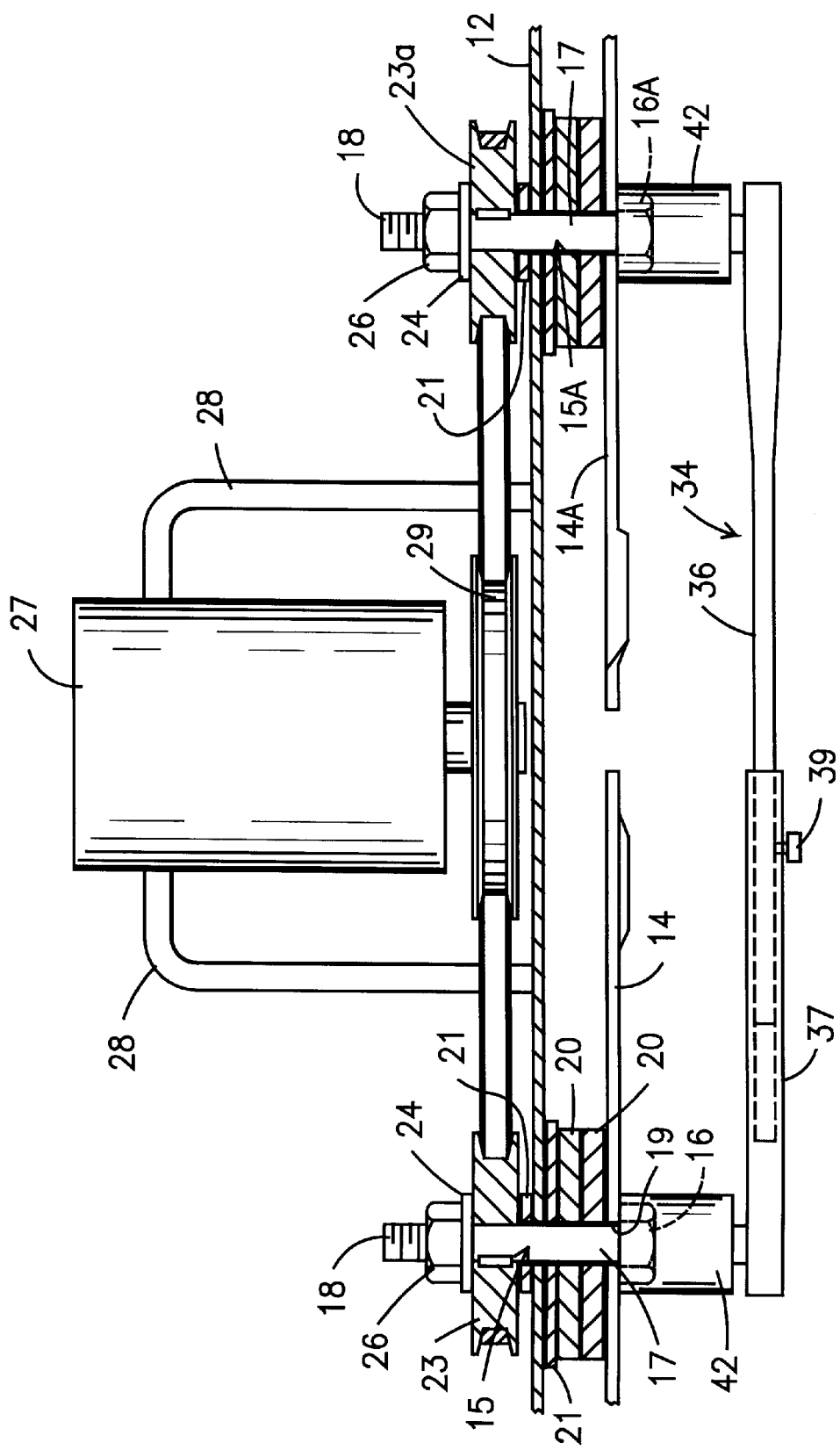
FIG. 4 is an enlarged fragmentary view taken like FIG. 2 which shows a double ended wrench mounted on and holding the blade spindles.

There is shown in FIG. 1 the plain view of a commercial mower 10 having a deck 12. Referring also to FIGS. 2 and 3, the deck 12 has an integral conventional skirt 13 depending therefrom. Within the confines of the deck and skirt art a pair of mower blades 14 and 14A, each conventionally mounted on a spindle 15 and 15A, respectively. The spindles 15 and 15A have respectively formed thereon a head 16, 16A, a shaft portion 17 and a threaded upper end 18 so that, in overall appearance, the spindles 15 and 15A look like elongated bolts. The blades 14 and 14A are mounted on the spindles 15 and 15A, respectively with a central opening 19 in the blade receiving the spindle and the lower side of the blade abutting the tops of the heads, 16, 16A respectively. Each spindle then passes through the central opening in one or more spacers 20 and a washer 21, with the spacers abutting the top surface of the blades 14 and 14A and the washer 21 being disposed between the spacers 20 and the deck 12. On each of the spindles 15 and 15A, immediately above and abutting the top of the deck 12 is a washer 22 and immediately above each of the washer 21 is a pulley 23 or 23A which is conventionally keyed to the spindle 15 and 15A, and a washer 24 in on the spindle and butting the top of each pulley 23 and 23A. Finally a nut 26 is threaded onto the threaded upper end 18 of each of the spindles to thereby tighten the pulley-spindle and blade assembly to the deck 12.

A motor 27 is conventionally carried by a plurality of supports 28 secured thereto and secured to the deck 12, with the motor shaft directed downwardly and mounting on its lower end a drive pulley 29 and this drive pulley is connected by a continuous belt 30 to the pulleys 23 and 23A in a conventional manner. As seen in FIG. 1, a conventional suitable idler pulley 31 is carried by a conventional suitable bracket 32 and the latter can be shifted, in a conventional manner, and by a well known shifting device (not shown) so that the pulley 31 will tighten the belt for driving the blades 14, 14A or to loosen the belt for a non-driving condition relative to the blades. Three ground engaging wheels 33 are conventionally carried by the deck 12 in a well known manner to support the deck for cutting movement relative to the supporting surface so that the blades 14, 14A can cut the grass below the deck 12. Means, not shown, are conventionally provided to move the mower 10, such as it being self propelled, manually pushed or connected to a tractor.

Referring now to FIG. 3, a spindle holding tool 34 in the form of a double ended wrench in shown. The medial portion 35 of the tool 34 is made up of a pair of telescoping members 36 and 37, with the member 36 being rectangular in cross section and telescopically received in a rectangular cross sectioned opening 38 in the member 37. A set screw 39 threadingly mounted in an opening 40 in the member 37 can be screwed inwardly to fix the relative telescopic movement of the member 36 inwardly or outwardly relative to the member 37.

The end of the members 36 and 37 each has a mounting boss 41 non-rotatably mounted thereon and extending laterally at right angles therefrom in a coplanar relationship with each other. Each of the bosses has removable mounted thereon a conventional socket 42. Since the usual spindle 15, 15A has a 15/16 inch head thereon, a 15/16 inch socket can be used. However, since some mowers do have a spindle 15; 15A with a different sized head 16, the sockets can be changed to match the head.

In the operation of sharpening the blades 14 and 14A which, on a commercial mower subject to frequent and extended use, is done very frequently, the prior art method required the removal of the blade by tipping the deck 12 sufficiently to reach under the deck with a wrench and grasp the head 16 of each spindle 15, 15A, in turn, and, while holding the wrench with one had to prevent spindle rotation, placing another wrench on the nut 16 to loosen and remove the same. In the instant invention the method involved appropriately spacing both of the sockets 42 of the spindle holding tool 34 and placing them on the heads 16 of both of the spindles simultaneously after reaching under the deck 12. With the tool located on both heads, the hand can be withdrawn from under the mower. The tool's reaction against the spindles keeps it in place and prevents either spindle from rotation and the operator can then remove each of the nuts 26 from a spindle 15; 15A. At this time, the tool 34 is removed from the heads 26 and the spindles are withdrawn downwardly until removed from the pulleys, washer, spacers and the blade. The blade is then sharpened and, ideally, a "sharp edge conventional protective coating" is placed on the sharpened edge. The spindle 15–15A is then reinserted through the blade 14–14A, the spaces 20 and washers 21, the deck, the keyed pulley and the nut 26 is then tightened thereon, to complete the assembly, the sockets of the tool 34 are removed from both the spindles.

While only a single embodiment of this invention has been shown and described, it is apparent that many changes can be made there without departing from the scope of this invention as set forth in the following claims.

What is claimed is:

1. A method for removing lawn mower spindles and cutting blades mounted thereon from a lawn mower housing of a rotary mower having more than one independently rotatable spindle extending vertically through the housing with each of the spindles having a nut threaded on the threaded upper end thereof and having a lower end nut shaped head thereon and a cutting blade mounted on each spindle above the head thereof comprising the steps of A) obtaining a wrench having at least two interconnected nut holding ends capable of having the space therebetween adjustably secured and appropriately securing the space therebetween, B) lifting the mower housing sufficiently to place the wrench under the housing by hand, C) placing one of the holding ends of said wrench on the head on the lower end of one of the spindles and simultaneously placing another holding end of the wrench on the head on the lower end of the other of the spindles thereby simultaneously holding the spindles against rotation, D) removing the nut on the top of each of the spindles and then moving the spindles out of the housing, out of any spacers and washers thereon, and finally out of the blade mounted thereon.

2. A method for removing from and then installing onto a horizontal deck of a rotary lawn mower, spindles and cutting blades mounted thereon wherein the mower has more than one spindle extending vertically through the deck and rotatably mounted therein and a cutting blade mounted on each of the spindles for rotation therewith and wherein the spindles have a threaded upper end with a nut thereon and a nut shaped lower head end comprising the steps of A) obtaining a wrench having at least two interconnected nut holding ends capable of having the space therebetween adjustably secured and appropriately securing the space therebetween B) lifting the mower housing sufficiently to lace the wrench under the housing, C) placing one of the holding ends of said wrench on the nut shaped lower head end of one of the spindles and placing another holding end of the wrench on the nut shaped lower head end of the other of the spindles and thereby simultaneously holding both of the spindles against rotation, D) rotating and removing the nut on the top of the spindles and moving the spindles out of the housing, out of any spacers and washers thereon, and finally out of the blade mounted thereon, E) obtaining a pair of sharpened cutting blades, F) placing a blade spindle into the opening of each of the blades with the lower head of the spindle engaging the underside of the blade and the threaded end of the spindle projecting above the blade, G) placing a spacer and washer on each of the spindles and inserting the spindles through registering openings in the deck of the lawn mower, H) obtaining a wrench having at least two interconnecting nut holding ends;

I) placing one of the nut holding ends of the wrench on the lower head of one of the spindles and placing the other holding end on the lower head of the other spindle, J) placing a pulley on each of the spindles in a non-rotative manner, K) applying a nut on top of each of said spindles and then tightening the nut while holding the lower head of both of the spindles stationary, L) lowering the housing.

3. The method according to claim 1 including the step of securing the spaced relationship of the interconnected nut holding ends of the wrench prior to placing the holding ends on the head ends of the spindle.

4. A method for removing lawn mower spindles and cutting blades mounted thereon from a rotary lawn mower horizontal housing having more than one vertically extending spindle therein and having a cutting blade mounted on the spindle for rotation therewith, and wherein each of the spindles extends vertically through the housing and has opposed ends with one of said opposed ends being a nut shaped head end positioned below the housing and the other of said opposed ends being a threaded end having a nut threaded thereon and being positioned above the housing comprising the steps of A) obtaining a first wrench having at least two interconnected nut holding ends capable of having the space therebetween adjustably secured and obtaining a second wrench, B) lifting the mower housing sufficiently to reach under the same and have access to the lower spindle head ends therebelow, C) placing the nut holding ends of said first wrench simultaneously on one of said opposed ends of two of said spindles disposed on the same side of the housing thereby holding said spindles against rotation, D) placing said second wrench on the other end of said spindles one at a time and moving same in a direction to remove said nut threaded on said spindles, and E) moving the spindles out of any spacers and washers thereon and finally out of the blade mounted thereon.

* * * * *